Feb. 8, 1972 G. E. WOJCIK 3,640,906

ELECTROCONDUCTIVE SINTERED GLASS

Filed June 16, 1969

INVENTOR.
GERALD E. WOJCIK
BY
Paul L. Sabatine
E. J. Holler
ATTORNEYS

United States Patent Office 3,640,906
Patented Feb. 8, 1972

3,640,906
ELECTROCONDUCTIVE SINTERED GLASS

Gerald E. Wojcik, Toledo, Ohio, assignor to
Owens-Illinois, Inc.
Filed June 16, 1969, Ser. No. 833,593
Int. Cl. C03b 23/20; C03c 15/00, 29/00
U.S. Cl. 252—519 5 Claims

ABSTRACT OF THE DISCLOSURE

Novel, low expansion, electroconductive sintered glass article, suitable for making electronic components and the like.

BACKGROUND OF THE INVENTION

The present invention pertains to novel, electro-conductive articles, and more particularly, to sintered glass articles of manufacture having at least one integral electrically conductive exposed surface. Specifically, the instant invention relates to new copper sintered glass bodies having a low electric resistant, metallic surface.

One of the chief problems often encountered with articles having an electric conductive coating is the excessive weight of said article. This excessive weight has its origin in the dielectric substance, like glass, that is conventionally employed as a substrate for an electrically conductive coating as used for fabricating commercially and scientifically important electric type devices. The excess weight of the conductive device may be a detrimental factor if the device is employed in miniature circuits or in the aerospace field. Another problem is the high thermal coefficient of expansion of the presently used substrate dielectric material which may lead to thermal shock in an aerospace flight and the resultant failure of the electroconductive device. From these and other like disadvantages which are serious in the art, it will be readily recognized that an electroconductive article that overcomes these disadvantages would be a valuable and useful contribution to the art.

Accordingly, it is therefore a broad objective of this invention to make available to the art a novel article of manufacture.

It is a further object of this invention to provide an electroconductive article that is essentially free from the disadvantages associated with the prior art.

Another object of this invention is to provide a sintered glass body having at least an internal electric conductive surface.

Yet still a further object of the present invention is to provide a sintered glass article having an inherent, low electrically resistant exposed stable surface.

An additional object of the present invention is to provide a sintered glass device having an integral conductive electrical surface wherein said glass substrate inherently provides the conductive material for said conductive surface.

These and other objects, features and advantages of this invention will become self-evident from the following detailed description of the mode and manner of practicing the invention.

SUMMARY OF THE INVENTION

This invention concerns a novel, essentially lighter in weight, low thermal coefficient of expansion sintered glass having at least one integral, exposed electroconductive surface.

DESCRIPTION OF THE INVENTION

In attaining the objects, features and advantages of the present invention, it has now been unexpectedly discovered that a low expansion copper glass can be successfully employed to fabricate an essentially lighter weight sintered glass article possessing an integral, controlled electroconductive exposed surface.

The copper glasses used for the purpose of the present invention act as a metal source for forming the electroconductive surface and as a substrate or base for the sintered glass housing the exposed conductive adherent layer. Generally, the copper glasses used herein have a linear thermal coefficient of expansion of about $3\times10^{-7}/°$ C. (0–300° C.) to about $10\times10^{-6}°/$ C. (0–300°). The copper glass used herein generally consists essentially of silicon dioxide ($SiO_2$), aluminum oxide ($Al_2O_3$), cuprous oxide ($Cu_2O$), cupric oxide ($CuO$); titanium oxide ($TiO_2$), ferric oxide ($Fe_2O_3$), nickel oxide ($NiO$), cobalt oxide ($CoO$) and aluminum trifluoride ($AlF_3$). The subject copper glasses generally consist essentially of 58 to 83 mole percent $SiO_2$, 4 to 20 mole percent $Al_2O_3$, 10 to 20 mole percent $Cu_2O$, 0 to 6 mole percent $Fe_2O_3$, 0 to 6 mole percent NiO, 0 to 6 mole percent CoO and 0 to 6 mole percent $AlF_3$; a copper glass containing 58 to 83 mole percent $SiO_2$, 4 to 20 mole percent $Al_2O_3$, 10 to 15 mole percent $Cu_2O$ and a member selected from the group consisting of 1 to 6 mole percent of $TiO_2$, CoO, NiO, $Fe_2O_3$ and $AlF_3$ and mixtures thereof; and a glass composition consisting essentially of 74.5 to 88 mole percent $SiO_2$, 2.5 to 10 mole percent $Al_2O_3$, 7.5 to 12.5 mole percent $Cu_2O$ and at least one of 1 to 6 mole percent $TiO_2$, $Fe_2O_3$, NiO, $AlF_3$ or CoC.

The glasses employed herein can be prepared by intimately blending the necessary batch constituents, melting and heating to such temperature so that all glass forming ingredients are present in a liquid state to enable the formation of a glass from a homogeneous melt. The glasses are usually prepared by mixing and then melting in a 90% platinum-10% rhodium crucible or a fused silica crucible. The size of the melt was usually between 2000 grams and 5500 grams or larger, and the melting temperature was about 1500° C. to 1600° C., for 20 to 30 hours. The melting was carried out in an electric heated furnace, although, other equivalent heating means could be successfully employed. The glasses were usually prepared under a slight oxygen atmosphere.

The copper glasses employed herein were prepared from commercially available reagents, for example, silicon dioxide ($SiO_2$); Kona Quintus quartz ($SiO_2$); Alcoa A–14 alumina ($Al_2O_3$); cupric oxide ($CuO$); cuprous oxide ($Cu_2O$); Titanox ($TiO_2$); Hi-Calumet cupric ($Cu_2O$); aluminum trifluoride ($AlF_3$); ferric oxide ($Fe_2O_3$); nickel oxide (NiO) and the like. Of course, the reagents employed for the purpose of the present invention may be made from other chemically functionally equivalent oxides, carbonates, fluorides, silicates, nitrates or any other chemical form which does not disturb or adversely affect the subject compositions.

Exemplary of a glass used for the purpose of the present invention is a glass characterized by a composition consisting essentially of 77.5 mole percent $SiO_2$, 10.0 mole percent $Al_2O_3$ and 12.5 mole percent $Cu_2O$, with an annealing point of 629° C., and unannealed density of 2.732 and a thermal coefficient of expansion of $3.2\times10^{-7}/°$ C. (0–300° C.). The immediate glass was prepared by intimately mixing 3745 grams of Kona Quintus quartz, 822.8 grams of A–14 alumina and 1493 grams of 96.3% cuprous oxide, and melting the mixed batch in a fused silica crucible at 2950° F., for about 24 hours under a 0.5% oxygen atmosphere. Other glass compositions were prepared as follows: a glass was prepared by melting a batch containing 3193 grams of Kona Quintus quartz, 700 grams of A–14 alumina, 1018 grams of $Cu_2O$ and 130.2 grams of NiO, for 24 hours and 40 minutes at 2950° F., to effect a glass having a theoretical composition of 77.5 mole percent $SiO_2$, 10.0 mole percent $Al_2O_3$, 10.0 mole percent $Cu_2O$ and 2.5 mole percent NiO; a glass prepared by intimately blending and melting, at 2920° F. for 24 hours and 30 minutes, a batch containing 3121 grams of Kona Quintus quartz, 686 grams of A–14 alumina and 1330 grams of Hi-Cupric Calumet to give a glass with the theoretical composition of 77.5 mole percent $SiO_2$, 10.0 mole percent $Al_2O_3$, and 12.5 mole percent $Cu_2O$, which glass had an unannealed density of 2.7020, an annealing point of 601° C., and a coefficient of expansion of $4.1 \times 10^{-7}$/° C. (0–300° C.); a glass consisting essentially of 75.0 mole percent $SiO_2$, 10.0 mole percent $Al_2O_3$, 12.5 mole percent $Cu_2O$ and 2.5 mole percent $Fe_2O_3$, was prepared from a batch containing 2922 grams of Kona Quintus quartz, 622 grams of A–14 alumina, 1204 grams of cuprous oxide and 259.6 grams of $Fe_2O_3$, by melting said batch for 24 hours in a 0.5% oxygen atmosphere; a glass composition consisting of 73 mole percent $SiO_2$, 12.5 mole percent $Al_2O_3$, 12.5 mole percent $Cu_2O$ and 2.0 mole percent $TiO_2$ was prepared by intimately blending and then melting at 2950° F. for 24 hours in a 0.5% oxygen atmosphere a batch containing 2883 grams of Kona Quintus quartz, 840 grams of A–14 alumina. 1220 grams of $Cu_2O$ and 106 grams of Titanox ($TiO_2$); and a glass consisting of 77 mole percent $SiO_2$, 9.25 mole percent $Al_2O_3$, 12.4 mole percent $Cu_2O$, and 1.3 mole percent $AlF_3$ from 3119 grams of Kona Quintus quartz, 589 grams of A–14 alumina, 1329 grams of Hi-Calumet cupric and 74 grams of aluminum fluoride. The copper glasses, in addition to being fully described supra, are also commercially available to the art.

In performing the spirit of this invention, it has been quite unexpectedly found that the above-described copper glasses can be used for manufacturing a sintered glass substrate for the composite sintered glass electrically conductive surface body. The copper glass can be sintered by first grinding the glass to a predetermined particle size, compacting the just ground particles in a mold, and then heating the mold to convert the particles into a sintered body. The sintered body can also be made by first mixing the ground particles with a vehicle that will burn off on heat and which will not have any deleterious effects on the glass, compacting the particles and vehicle, and then heating the compact solid body without converting it into a molten or fluid glass to a sintered body.

Various binders are suitable for the purpose of forming the sintered body when said binders are employed for this purpose. One organic binder is nitrocellulose mixed with amyl acetate, another is gelatin and the like. Usually, the commercially available binder material will be any vehicle that easily burns off at elevated temperatures and does not have any harmful effects on the glass composition. Exemplary of other suitable binders are nitrocellulose and butylacetate, camphor with cellulose, the polyethylene glycols and the like. The polyethylene glycols suitable for the present purpose are commercially available and they have an average molecular weight of 15,000 to 20,000; a freezing point of 50 to 55; a viscosity at 210° F. of 57.3; an average liquid specific heat per cal./° C. of 0.59; a heat of fusion per cal./g. of 41; a surface tension at 25° C. in dynes/cm. of 52; a solubility on water at 20° C. expressed in percent by weight of 60 and a flash point greater than 465° F. methyl cellulose, ethyl cellulose and the like. When a binder or vehicle is used for the present purpose, the binder and the glass particles are mixed into a slurry and poured into a mold. The resulting slurry is dried to form granulations in which the binder holds or adheres together the glass particles uniformly dispersed within the mold. After the particles have dried in the mold, they are compacted with a pressure of 7,500 p.s.i. to 12,500 p.s.i. The pressed article is then sintered at the sintering temperature of 1700° F. to 1850° F. for the sintering time of 12 to 18 minutes. After the sintering period is complete, the surface of the just produced sintered article is treated with an aliphatic carboxylic acid to give an electroconductive sintered surface.

The acids suitable for the purpose of the present invention are unsaturated aliphatic acids having from 6 to 20 carbon atoms in the acid, exclusive of the terminal carboxylic acid groups. If there is a single carboxylic acid group, the aliphatic acid will have a total of from 6 to 21 carbon atoms, and if there are two carboxylic acid groups, the aliphatic acid will have from 6 to 22 carbon atoms. Exemplary of aliphatic carboxylic acids that can be employed within the mode and manner of the present invention are acids having a total of from 6 to 22 carbons such as hexenic, hypogeic, oleic, palmitolic, stearolic, linoleic, tetradecyne, erucic, pentadecyne, hexadecyne and the like.

The following discussion and examples are merely illustrative of the spirit of the invention and they are not to be considered as limiting as these and other advantages will become obvious to those versed in the art in the light of the hereinafter material.

Example 1

A piece of copper glass consisting essentially of 77 mole percent $SiO_2$, 9.25 mole percent $Al_2O_3$, 12.4 mole percent $Cu_2O$ and 1.3 mole percent $AlF_3$ was crushed and ground to a uniform particle size in a conventional laboratory ball mill grinder. Next, a part of the ground glass was mixed with a nitrocellulose amyl acetate binder and blended in a small V-blender to obtain a paste-like slurry. The slurry was then spooned into a steel mold having sides about ¼ inch thick and allowed to air dry. Then, the contents of the mold were compacted under a conventional pressure head at 10,000 p.s.i. The article was, after compacting, placed into a preheated electrically treated sintering furnace and sintered at 1800° F. for 15 minutes. After 15 minutes, the sintered part was removed from the furnace and dipped into the unsaturated aliphatic carboxylic acid, oleic, to give the novel, electro-conductive surface active, lightweight sintered glass part. When a sintered glass article is formed and dipped in an aliphatic acid, the acid flows throughout the porous structure and the whole, lightweight, low expansion glass becomes electroconductive. If the carboxylic acid is applied to the surface then the conductive coating is a few mils in depth, usually about 0.1 to 15 mils. In the next example is described a procedure for treating part of the surface of a sintered glass article.

Example 2

In this example, a portion of the ground glass as set forth in Example 1 was ground to a particle mesh size of about 50 mesh and mixed with a commercially available polyethylene glycol to give a slurry. The slurry was then poured into a square shaped mold, compacted under about 10,500 p.s.i. pressure, and then it was sintered at about 1800° F. for about 14 to 16 minutes. After the sintering was complete, the hot sintered article was sprayed with oleic acid to give a low resistant surface on the sintered glass.

Example 3

In this example, a copper glass consisting of 77 mole percent $SiO_2$, 9.25 mole percent $Al_2O_3$, 12.4 mole percent $Cu_2O$ and 1.3 mole percent $AlF_3$ was crushed in a hammer mill and then ground to a fine powder in a three roll steel powder mill. Next, a stainless steel mold, measuring about 1 inch by ¼ inch by ¼ inch, was filled with the powder, and the mold contents were then compacted at about 10,000 p.s.i. to give a solid mass. The essentially vehicle free mass was next placed into a furnace that was preheated to 1775° F.–1800° F. and maintained at this temperature for about 15 minutes. After 15 minutes, the hot sintered article was dipped into oleic acid to give the desired electroconductive surface sintered glass item.

Example 4

According to this example, it can now be demonstrated that specific, predetermined electroconductive pattern can be made on the surface of the sintered glass article. In carrying out the process for making a predetermined design, first, a sintered glass article is formed as described in any of the previous examples with the additional step that a template is placed in intimate contact with the just formed, hot sintered glass article before the aliphatic acid is applied by brush, spraying, or the like. The electroconductive surface is developed by this technique only in the exposed areas within the template. The template, like the mold, can be of any given geometric design, and it is usually made of stainless steel. The adherent, stable, metallic conductive surface produced by the above examples were then subjected to various art known tests.

One of the tests conducted on the electrometallic surface was the measuring of the resistance for any given area. The resistance, expressed in ohms per square, was measured on a sintered glass article prepared according to Example 3 and it had a resistance of less than 0.1 ohm. In contrast, glass samples that were not treated according to the present process had a resistivity of about $10^8$ to $10^9$ ohms per square. The resistance was measured with a standard, commercially available ohm meter. Silver contact prints were usually applied to the end of the glass sample to insure good resistance measurements. The silver contact prints were applied by easily coating a small area with a commercially available silver paint. The resistance is reported in ohms per square which takes into account the sample size and gives a valid basis for measuring and for comparison.

Sintered glasses prepared by the above-described techniques were further tested by standard evaluation tests to demonstrate the unexpected results of the present invention. Among the tests conducted were the standard adhesion test, the scratch test, the modulus of rupture test and the weight test.

The adhesion test was conducted by hand pressing commercial electrician's tape to the various surfaces of glasses and then observing the amount of copper coating which adheres to the tape. This test indicates the adhesion of the metallic copper to the base glass. The results for the adhesion test were expressed as fair, good or excellent adhesion. The adhesion test was conducted on various glass compositions, such as, a glass consisting essentially of 7.75 mole percent $SiO_2$, 10 mole percent $Al_2O_3$ and 12.5 mole percent $Cu_2O$. When the present sample was treated as herein described, the adhesion test indicated good adhesion, which demonstrates the intimate, adherent properties for the metallic conductive surface.

The glasses were also subjected to a scratch test, which test consists of running or scratching a nail across the surface of untreated and treated glasses to indicate the scratch resistance of the glasses. The scratch resistance for a non-acid treated glass was a fair anti-scratch property. An acid-treated glass demonstrated excellent scratch resistance.

The modulus of rupture (M.O.R.) for Example 3 was measured in a conventional Instron strength machine. The glass produced in Example 3 had an M.O.R. of 13,000 p.s.i. The weight test was conducted by brazing a piece of wire to the conductive surface and adding weights until the solder seal failed. For example, in Example 3, 600 p.s.i. were required before the seal broke, which indicates good sealing properties for the surface.

Figure 1:
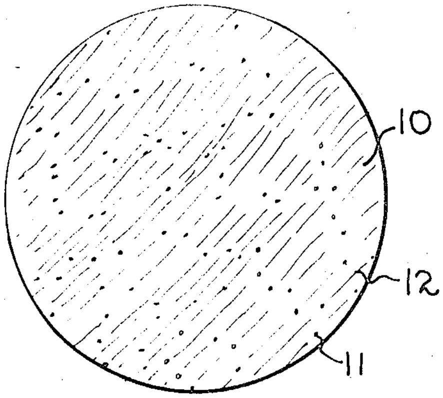
FIG. 1 is a perspective view of a sintered glass disk formed according to the present invention.
Figure 2:
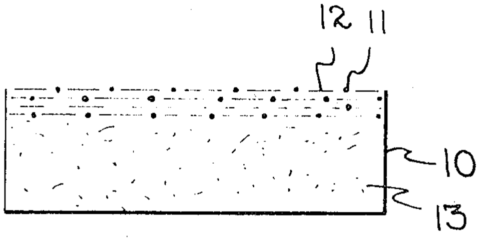
FIG. 2 is a sectional view taken through the center of the disc illustrated in FIG. 1.

As shown in the drawings, there is provided a piece of sintered glass, depicted as a disc 10, through the sintered glass and may be in any shape, formed of a series of pores 11 for decreasing both the cost and the weight of the sintered glass articles, a metallic conductive surface coating 12 which is an integral part of the sintered glass to form one continuous composite article, and areas of the sintered glass 13 that are non-conducative, usually below the surface or covered by the template.

The novel articles of the present invention can be used in the fields of commerce and science. For example, the applications include printed circuits on sintered glass substrates, capacitors, as bus bars for carrying current, for printed circuits in airplanes where there is sudden temperature change to prevent temperature shock failure, and the like.

Obviously, many modifications and variations of the instant invention are possible in the light of the above teachings, and, it is therefore to be understood that within the scope of the disclosure and claims, the invention may be practiced otherwise than as specifically described.

I claim:

1. The method of forming at least one electroconductive area on a sintered glass wherein said method comprises:

(a) grinding a low expansion copper glass to essentially uniform glass particle size, (b) compacting at a pressure of 7,500 to 12,500 pounds per square inch the low expansion copper glass particles, (c) sintering the compacted particles at 1700° F. to 1800° F. for 12 to 18 minutes, (d) intimately contacting at least one area of the hot sintered glass with an aliphatic carboxylic acid having 6 to 22 carbon atoms, and (e) cooling to ambient temperature the acid contacted sintered glass to give the desired adherent, electroconductive sintered glass.

2. The method of forming an electroconductive sintered glass according to claim 1 wherein the copper glass consists essentially of 58 to 83 mole percent $SiO_2$, 4 to 20 mole percent $Al_2O_3$, 10 to 20 mole percent $Cu_2O$, 0 to 6 mole percent $Fe_2O_3$, 0 to 6 mole percent NiO, 0 to 6 mole percent CoO and 0 to 6 mole percent $AlF_3$.

3. The method of forming an electroconductive sintered glass according to claim 1 wherein the electroconductive area is formed by immersing the hot sintered glass into the carboxylic acid.

4. The method of forming an electroconductive sintered glass according to claim 1 wherein the electroconductive area is formed by intimately contacting a predetermined surface area of the hot sintered glass with the carboxylic acid.

5. An article of manufacture produced by the process of claim 1.

References Cited

UNITED STATES PATENTS

| | | | |
|---|---|---|---|
| 2,647,068 | 7/1953 | Patai | 65—30 |
| 2,993,815 | 7/1961 | Treptow | 252—512 X |
| 3,116,137 | 12/1963 | Vasilus et al. | 65—18 X |
| 3,154,503 | 10/1964 | Janakirama-Rao | 65—30 X |
| 3,238,151 | 3/1966 | Kim | 252—518 |
| 3,249,466 | 5/1966 | Lusher | 65—18 X |
| 3,294,496 | 12/1966 | Berghezan | 65—30 X |
| 3,420,645 | 1/1969 | Hair | 65—22 X |
| 3,464,806 | 9/1969 | Seki et al. | 65—32 |
| 3,490,887 | 1/1970 | Herczog | 65—32 X |

FOREIGN PATENTS

| | | | |
|---|---|---|---|
| 1,495,831 | 10/1967 | France | 65—18 |

FRANK W. MIGA, Primary Examiner

U.S. Cl. X.R.

65—18, 22, 30, 33, 116, 111, 32, 154, 155, 59; 106—49

PO-1050
(5/69)

UNITED STATES PATENT OFFICE
CERTIFICATE OF CORRECTION

Patent No. 3,640,906 Dated February 8, 1972

Inventor(s) Wojcik, Gerald E.

It is certified that error appears in the above-identified patent and that said Letters Patent are hereby corrected as shown below:

Column 5, line 3, "pattern" should read - - - patterns - - - . Column 5, line 47, "7.75" should read - - - 77.5 - - - . Column 6, line 6, "non-conducative" should read - - - non-conductive - - - .

Signed and sealed this 13th day of June 1972.

(SEAL)
Attest:

EDWARD M.FLETCHER,JR.
Attesting Officer

ROBERT GOTTSCHALK
Commissioner of Patents